US012634108B2

(12) United States Patent
Donohue

(10) Patent No.: US 12,634,108 B2
(45) Date of Patent: May 19, 2026

(54) COMMUNICATION DEVICE AND INTERPACKET GAP ADJUSTMENT METHOD THEREOF

(71) Applicant: Cortina Access, Inc., San Jose, CA (US)

(72) Inventor: Ryan Patrick Donohue, San Jose, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 318 days.

(21) Appl. No.: 18/533,276

(22) Filed: Dec. 8, 2023

(65) Prior Publication Data

US 2025/0192976 A1 Jun. 12, 2025

(51) Int. Cl.
*H04L 7/00* (2006.01)
(52) U.S. Cl.
CPC ................................. *H04L 7/0079* (2013.01)
(58) Field of Classification Search
CPC ... H04L 7/0079; H04L 12/4013; H04L 47/25; H04L 49/90; H04J 3/0632
See application file for complete search history.

(56) References Cited

U.S. PATENT DOCUMENTS

| | | | |
|---|---|---|---|
| 10,827,040 B2* | 11/2020 | Caldwell | H04L 69/18 |
| 11,671,281 B1* | 6/2023 | Shrikhande | H04L 12/4633 |
| | | | 370/252 |
| 2014/0147130 A1* | 5/2014 | Poulsen | H04L 7/0075 |
| | | | 398/208 |
| 2019/0394309 A1* | 12/2019 | Caldwell | H04L 1/0084 |

* cited by examiner

*Primary Examiner* — Ayanah S George
(74) *Attorney, Agent, or Firm* — McClure, Qualey & Rodack, LLP

(57) ABSTRACT

A communication device includes a CDR (clock data recover) unit, a receiver unit, a transmitter unit, and an IPG (interpacket gap) adjustment unit. The CDR unit recovers a recovered clock of incoming packets. The receiver unit is coupled to the CDR unit and receives the incoming packets. The transmitter unit transmits outgoing packets and IPGs therebetween. The IPG adjustment unit is coupled between the transmitter unit and the CDR unit and outputs the IPG adjustment signal based on a comparison of the recovered clock and the local reference clock. An IPG adjustment method of the communication device is also provided.

19 Claims, 3 Drawing Sheets

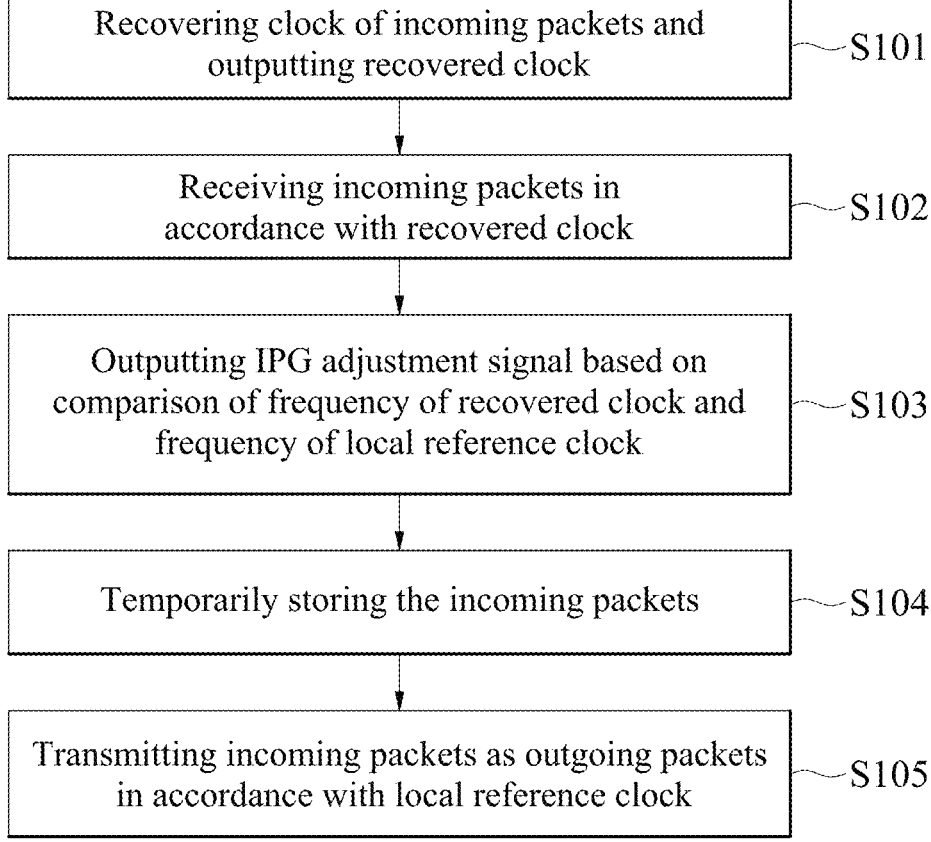

Recovering clock of incoming packets and outputting recovered clock ⌐~S101

Receiving incoming packets in accordance with recovered clock ⌐~S102

Outputting IPG adjustment signal based on comparison of frequency of recovered clock and frequency of local reference clock ⌐~S103

Temporarily storing the incoming packets ⌐~S104

Transmitting incoming packets as outgoing packets in accordance with local reference clock ⌐~S105

FIG. 3

COMMUNICATION DEVICE AND INTERPACKET GAP ADJUSTMENT METHOD THEREOF

BACKGROUND

Technical Field

The instant disclosure is related to a communication device, particularly to a communication device having an interpacket gap adjustment unit able to adjust interpacket gaps.

Related Art

Communication devices such as Ethernet equipment sends Ethernet packets between communication devices using a protocol, such as a protocol defined in the relevant IEEE 802.3 specifications. Each communication device in an Ethernet system can send packets to other communication devices and receive packets from other communication devices.

For example, a first communication device transmits packets to a second communication device based on a first local reference clock, and the second communication device operates based on a second local reference clock that is different from the first local reference clock. The second Ethernet receiver recovers the remote clock frequency (i.e., the clock frequency of the first local reference clock in this case) and extracts the packet in order to receive information. Therefore, the media access control (MAC) receive (RX) function of the second communication device operates on the recovered link partner clock (i.e., the remote clock frequency that has been recovered). After a packet is received in the MAC RX function, the packet is to be transferred to the local crystal reference domain (i.e., the second local reference clock in this case).

In order to provide debug capability for Ethernet equipment, there is a desire to include loopback functionality in Ethernet equipment. When loopback is enabled in a communication device, received packets are immediately transmitted back to the sender. The loopback functionality allows the sender to verify that the connectivity and basic operation of the network is sound.

However, communication devices with the loopback functionality can have a packet throughput problem. The packet throughput problem occurs when the sending communication device operates with a reference clock that is faster than a reference clock with which the receiving communication device operates (such as 25 MHz+100 ppm and 25 MHz−100 ppm, respectively). If the sending communication device sends a stream of packets with minimum interpacket gap (IPG), the transmitter of the receiving communication device will be unable to keep up because of the speed difference. For each additional second, the amount of excess packet build-up increases. Even if the loopback communication device implements a buffer to temporarily store the excess packets, there is no buffer size that can be guaranteed not to overflow. As a result, the receiving communication device has to drop Ethernet packets from time to time in order to match packet flow rates.

To get around this problem, a typical solution is to allow the communication device to transmit out based on the recovered clock rather than the local reference clock. This solves the packet throughput problem by having the loopback device use the same exact frequency on both the transmitter and receiver. This means that there will be no excess packet build up. However, in this case, the transmitter suffers from negative effects such as clock jitter multiplication and noise coupling since it is not transmitting from a clean crystal reference. This limits the range and conditions over which loopback can operate. Besides, failures during loopback may occur due to poor loopback clock performance.

SUMMARY

To address the above issues, some embodiment of the present disclosure provide a communication device comprising a CDR (clock data recover) unit, a receiver unit, a transmitter unit, and an IPG adjustment unit. The CDR unit is configured to recover a clock of incoming packets and output a recovered clock. The receiver unit is coupled to the CDR unit and configured to operate based on the recovered clock and receive the incoming packets. The transmitter unit is configured to operate based on a local reference clock and transmit outgoing packets and IPGs therebetween. A length of each of the IPGs corresponds to an IPG adjustment signal. The IPG adjustment unit is coupled between the transmitter unit and the CDR unit and configured to output the IPG adjustment signal based on a comparison of a frequency of the recovered clock and a frequency of the local reference clock.

In some embodiments, an IPG adjustment method applied to a communication device comprises: recovering a clock of incoming packets and outputting a recovered clock; receiving the incoming packets in accordance with the recovered clock outputting an IPG adjustment signal based on a comparison of a frequency of the recovered clock and a frequency of a local reference clock; temporarily storing the incoming packets; and transmitting the incoming packets as the outgoing packets in accordance with the local reference clock. An IPG exists between two consecutive ones of the outgoing packets. A length of the IPG is adjusted in accordance with the IPG adjustment signal.

In some embodiments, a communication device comprises a CDR (clock data recover) unit, a receiver unit, an IGP (interpacket gap) adjustment unit, and a transmitter unit. The CDR unit is configured to recover a clock of incoming packets and output a recovered clock. The receiver unit is coupled to the CDR unit and configured to operate based on the recovered clock and receive the incoming packets. The IPG adjustment unit is configured to output an IPG adjustment signal based on a comparison of a frequency of the recovered clock and a frequency of a local reference clock. The transmitter unit is configured to operate based on the local reference clock and transmit outgoing packets and IPGs therebetween in response to the communication device operating at a loopback mode. A length of the IPG is adjusted in accordance with the IPG adjustment signal. The IPG adjustment unit is coupled between the CDR unit and the transmitter unit.

As above, one or some embodiments of the present disclosure provide a superior loopback configuration for communication devices with no packet drops and no compromise in clock quality. One or some embodiments of the present disclosure allow a communication device to loop back packets to the sender without dropping any packet. As a result, the loopback can perform optimally, and any packet drop in the system is not due to clock mismatch. In addition, one or some embodiments of the present disclosure allows the transmitted packets to be transmitted purely with the local reference when the loopback functionality is disabled. This allows the loopback configuration to be exactly electrically the same as the non-loopback configuration, and therefore any packet drop will not be due to clock mismatch or jitters.

BRIEF DESCRIPTION OF THE DRAWINGS

The disclosure will become more fully understood from the detailed description given herein below for illustration only, and thus not limitative of the disclosure, wherein:

FIG. 3 illustrates a flow chart of an IPG adjustment method according to some embodiments of the present disclosure;

DETAILED DESCRIPTION

Figure 1:
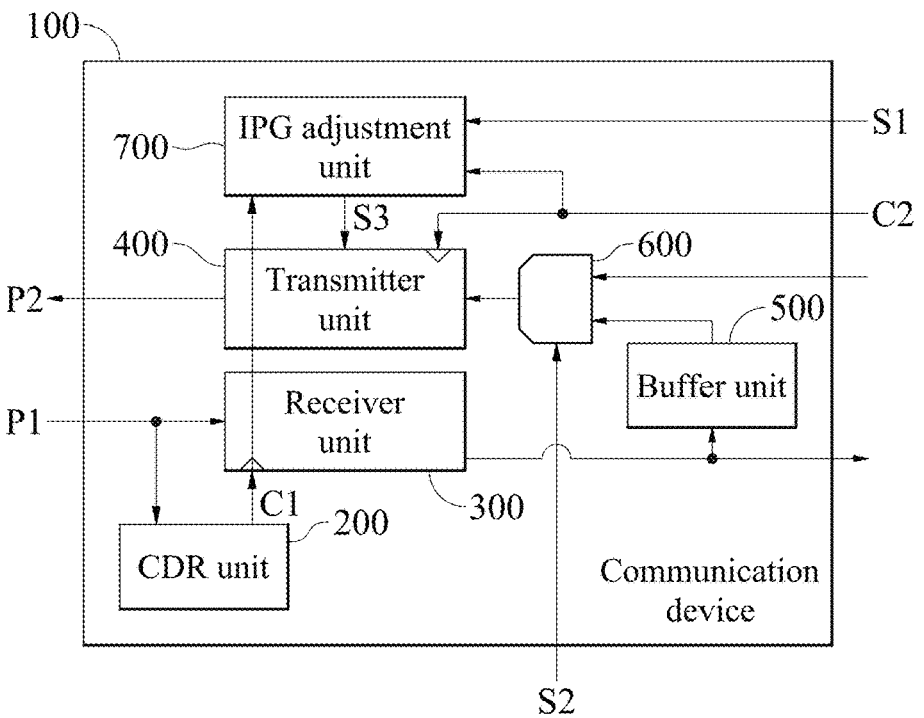
FIG. 1 illustrates a block diagram of a communication device according to some embodiments of the present disclosure.

Please refer to FIG. 1. In some embodiments, a communication device 100 comprises a CDR (clock data recover) unit 200, a receiver unit 300, a transmitter unit 400, a buffer unit 500, a loopback unit 600, and an IPG (interpacket gap) adjustment unit 700. The communication device 100 is able to receive incoming packets P1 and transmit outgoing packets P2, where the incoming packets P1 may come from an Ethernet testing device, and the outgoing packets P2 include the incoming packets P1 when a loopback function is enabled (or when the communication device 100 operates at a loopback mode). In some embodiments, the communication device 100 is an Ethernet device, such as an Ethernet node. In some embodiments, the communication device 100 may be an internet chip or a system on chip (SOC) capable of internet communication. In some embodiments, the receiver unit 300 is a MAC receiver, and the transmitter unit 400 is a MAC transmitter.

The CDR unit 200 is configured to recover a clock of the incoming packets P1 and output a recovered clock C1. The receiver unit 300 is coupled to the CDR unit 200 and configured to operate based on the recovered clock C1 and receive the incoming packets P1. The transmitter unit 400 is configured to operate based on a local reference clock C2 and transmit the outgoing packets P2 and IPGs therebetween (an IPC exists between two consecutive outgoing packets P2). In some embodiments, the local reference clock C2 (such as 25 MHz+−100 ppm) is implemented using a crystal oscillator. A length of each of the IPGs corresponds to an IPG adjustment signal S3. The buffer unit 500 is coupled to the receiver unit 300 and configured to store the incoming packets P1. In some embodiments, a first-in-first-out (FIFO) function is integrated into the buffer unit 500, and therefore the incoming packets P1 can reliably transition from one clock domain to another without corruption.

Because receiving Ethernet packets involves clock recovery and a transfer of the packet to another clock domain, a protocol can specify a number of features that are designed to provide minimum spacing in between back-to-back packets. Said features include the inter-packet gap (IPG). For example, the IPG may be specified by the IEEE 802.3 protocol for different Ethernet speeds, where transmitters are to provide at least 96 bits of IPG time in between packets. This minimum gap is intended to ensure that there is sufficient time in between packets to allow the packets to be bridged from the received clock domain to the local clock domain without any loss of data. In some embodiments, the IPG in the present disclosure can conform to relevant definitions according to the IEEE 802.3 protocol.

The loopback unit 600 is configured to read the incoming packets P1 from the buffer unit 500. In response to a loopback function being enabled, the loopback unit 600 transmits the incoming packets P1 stored in the buffer unit 500 to the transmitter unit 400, and the transmitter unit 400 transmits the incoming packets P1 as the outgoing packets P2. In response to the loopback function being disabled, loopback unit 600 does not transmit the incoming packets P1 stored in the buffer unit 500 to the transmitter unit 400, and therefore the packets flow through the receiver unit 300 and the transmitter unit 400 separately as described in the relevant IEEE 802.3 specifications. In some embodiments, the loopback function is enabled using a loopback enable signal S2. That is, when the loopback enable signal S2 indicates enabling the loopback function, the loopback function will be enabled, and the loopback unit 600 transmits the incoming packets P1 stored in the buffer unit 500 to the transmitter unit 400.

Figure 2:
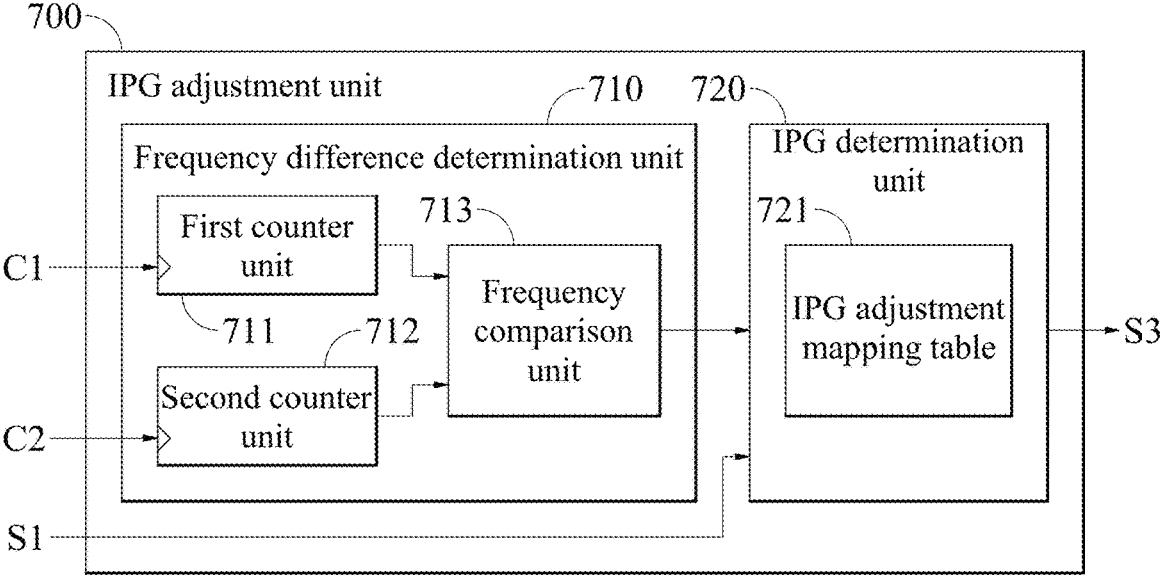
FIG. 2 illustrates a block diagram of an IPG adjustment unit according to some embodiments of the present disclosure.

Please also refer to FIG. 2. The IPG adjustment unit 700 is coupled between the transmitter unit 400 and the CDR unit 200 and configured to output the IPG adjustment signal S3 based on a comparison of a frequency of the recovered clock C1 and a frequency of the local reference clock C2. In some embodiments, the IPG adjustment unit 700 comprises a frequency difference determination unit 710 and an IPG determination unit 720. The frequency difference determination unit 710 is configured to receive the recovered clock C1 and the local reference clock C2 and output a frequency difference based on the recovered clock C1 and the local reference clock C2. The IPG determination unit 720 is configured to receive the frequency difference and output the IPG adjustment signal S3 based on the frequency difference. In some embodiments, the IPG adjustment unit 700 is configured to output the IPG adjustment signal S3 based on a communication speed signal S1 and the comparison of the frequency of the recovered clock C1 and the frequency of the local reference clock C2.

In some embodiments, the frequency difference determination unit 710 comprises a first counter unit 711, a second counter unit 712, and a comparison unit 713. The first counter unit 711 is configured to receive the recovered clock C1 and output a first counting value. The second counter unit 712 is configured to receive the local reference clock C2 and output a second counting value. The frequency comparison unit 713 is configured to compare the first counting value and the second counting value and output the frequency difference. The first counter unit 711, the second counter unit 712, and the comparison unit 713 may be implemented using software, hardware, or firmware.

For example, the first counter unit 711 and the second counter unit 712 begin counting up from zero. Because the first counter unit 711 is counting in the clock domain of the recovered clock C1 and the second counter unit 712 is counting in the clock domain of the local reference clock C2, the counting speed of the first counter unit 711 and the counting speed of the second counter unit 712 may be identical or not identical. Once one of the first counter unit 711 and the second counter unit 712 reaches a count value of a designated stopping count (such as 1,000,000), both the first counter unit 711 and the second counter unit 712 are halted. Next, the count value of the other one of the first counter unit 711 and the second counter unit 712 is examined to determine how many counts it achieved during the same time span. If the two count values are identical, then the recovered clock C1 and the local reference clock C2 have identical frequencies.

In some embodiments, the IPG determination unit 720 is configured to output the IPG adjustment signal S3 in accordance with an IPG adjustment mapping table 721. The IPG adjustment mapping table 721 comprises a correspondence relationship between an IPG adjustment value and the frequency difference, and the IPG adjustment signal S3 indicates an adjustment to the length of each of the IPGs in accordance with the IPG adjustment value. In embodiments where the communication speed signal S1 is also taken into consideration, the IPG adjustment mapping table 721 comprises a correspondence relationship between the IPG adjustment value, the frequency difference, and the communication speed signal S1, as shown in Table 1 below. It should be noted that the entries in Table 1 are listed as an example, and a person skilled in the art may readily create other values based on the present disclosure. In some embodiments, the IPG adjustment mapping table 721 is configured by software. In some embodiments, the communication device is an Ethernet device, and the communication speed is Ethernet speed. The Ethernet speed may be one of a plurality of speeds such as 1 Gb/s and 10 Gb/s. In some embodiments, under the different Ethernet speeds and the same frequency difference range, the corresponding IPG adjustment amount is different.

TABLE 1

| Communication speed | Frequency difference | IPG adjustment |
|---|---|---|
| 1 Gb/s | 0 count | 0 bit |
| 1 Gb/s | 0~100 counts | −8 bits |
| 1 Gb/s | 100~500 counts | −16 bits |
| 1 Gb/s | >500 counts | −24 bits |
| 10 Gb/s | 0 count | 0 bit |
| 10 Gb/s | 0~100 counts | −32 bits |
| 10 Gb/s | >100 counts | −64 bits |

Specifically, in some embodiments, in response to the frequency of the recovered clock C1 being greater than the frequency of the local reference clock C2, the IPG adjustment signal S3 indicates a negative IPG adjustment. The negative IPG adjustment indicates reducing the length of each of the IPGs in accordance with the IPG adjustment value. In some embodiments, the negative IPG adjustment is reducing the IPG based on a normal value (such as the minimal IPG of 96 bits defined in the IEEE 802.3 protocol) and the IPG adjustment value. That is, when the recovered clock C1 is faster than the local reference clock C2, the IPGs are to be reduced. In some embodiments, the IPG is negatively correlated with the frequency of the recovered clock. In some embodiments, when the frequency difference is zero or negative (i.e., when the recovered clock C1 is equal to or less than the local reference clock C2), the IPG adjustment value is 0 (no adjustment to the IPGs). However, a user can freely choose to still adjust the IPGs even when frequency difference is negative. In some embodiments, the IPG adjustment value may be designed as positive or negative in accordance with demands.

In some embodiments, it is sufficient to run the first counter unit 711 and the second counter unit 712 one time after loopback function is enabled and then let the communication device 100 operate with the resulting IPG in a static manner. In other embodiments, it is possible to continuously re-run the first counter unit 711 and the second counter unit 712 so that the frequency difference is continuously measured, and thus the IPGs are continuously updated. Continuously updating the IPGs leads to a time-varying minimum IPG value. As a result, a more optimal behavior may be obtained.

Please also refer to FIG. 3. In some embodiments, an IPG adjustment method applied to the communication device 100 comprises step S101 through step S105. In step S101, the CDR unit 200 recovers the clock of the incoming packets P1 and outputs the recovered clock C1. In step S102, the receiver unit 300 receives the incoming packets P1 in accordance with the recovered clock C1. In step S103, the IPG adjustment unit 700 outputs the IPG adjustment signal S3 based on the comparison of the frequency of the recovered clock C1 and the frequency of the local reference clock C2. In step S104, the buffer unit 500 temporarily stores the incoming packets P1. In step S105, the transmitter unit 400 transmits the incoming packets P1 as the outgoing packets P2 in accordance with the local reference clock C2. When the transmitter unit 400 transmits the incoming packets P1 as the outgoing packets P2, the IPG exists between two consecutive ones of the outgoing packets P2, and the length of the IPG is adjusted in accordance with the IPG adjustment signal S3. In some embodiments of step S105, the loopback unit 600 reads the incoming packets from the buffer unit 500, and in response to the loopback function being enabled, the loopback unit 600 transmits the incoming packets P1 stored in the buffer unit 500 to the transmitter unit 400. In some embodiments, step S103 may be performed before, alongside, or after step S102 and step S104. In other words, in some embodiments, step S103 can be performed anywhere between step S101 and step S105.

In some embodiments where the communication speed signal S1 is also taken into consideration, in step S103, the IPG adjustment unit 700 outputs the IPG adjustment signal S3 based on the communication speed signal S1 and the comparison of the frequency of the recovered clock C1 and the frequency of the local reference clock C2.

Figure 4:
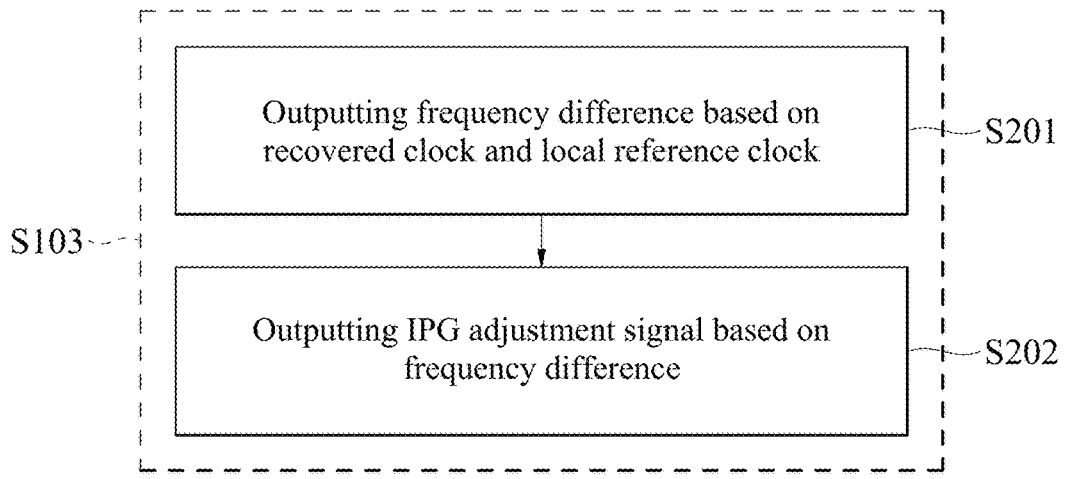
FIG. 4 illustrates a flow chart of an IPG adjustment method according to some embodiments of the present disclosure.

Please also refer to FIG. 4. In some embodiments, step S103 comprises step S201 and step S202. In step S201, the frequency difference determination unit 710 outputs the frequency difference based on the recovered clock C1 and the local reference clock C2. In some embodiments of step S201, the frequency difference determination unit 710 receives the recovered clock C1 and the local reference clock C2 and outputs the frequency difference based on the recovered clock C1 and the local reference clock C2. In step S202, the IPG determination unit 720 outputs the IPG adjustment signal S3 based on the frequency difference. In some embodiments of step S201, the IPG determination unit 720 receives the frequency difference and outputs the IPG adjustment signal S3 based on the frequency difference. In some embodiments, the IPG adjustment S3 signal is generated in accordance with the IPG adjustment mapping table 721.

In some embodiments where the communication speed signal S1 is also taken into consideration, in step S202, the IPG determination unit 720 receives the frequency difference and the communication speed signal S1 and outputs the IPG adjustment signal S3 based on the frequency difference and the communication speed signal S1.

Figure 5:
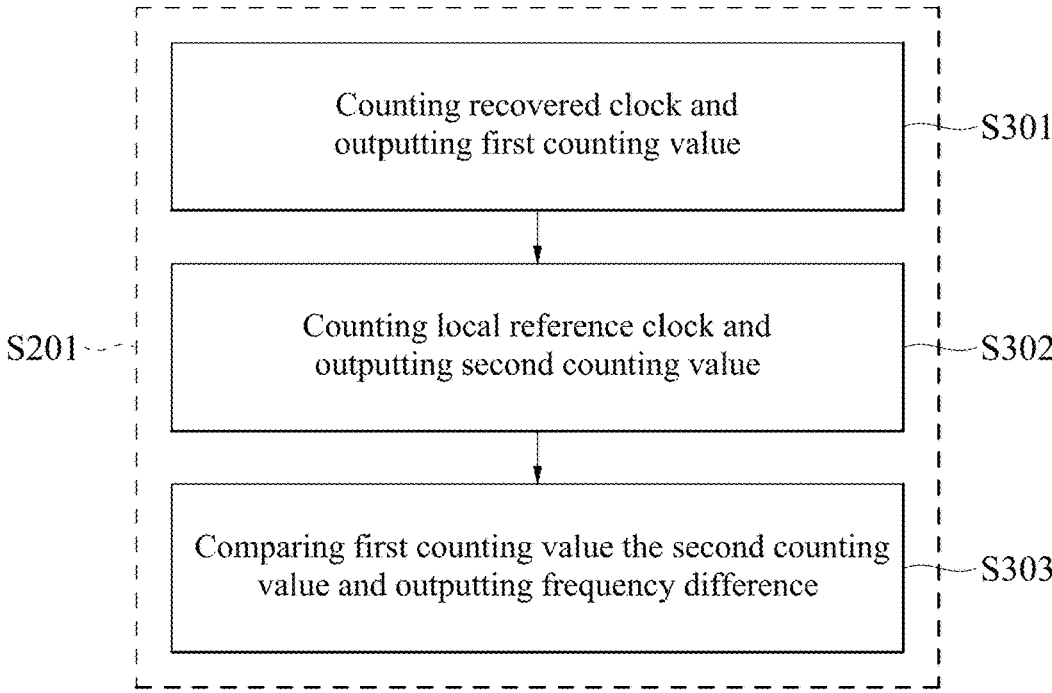
FIG. 5 illustrates a flow chart of an IPG adjustment method according to some embodiments of the present disclosure.

Please also refer to FIG. 5. In some embodiments, step S201 comprises step S301 through step S303. In step S301, the first counter unit 711 counts the recovered clock C1 and outputs the first counting value. In some embodiments of step S301, the first counter unit 711 receives the recovered clock C1 and outputs the frequency of the recovered clock C1. In step S302, the second counter unit 712 counts the local reference clock C2 and outputs the second counting value. In some embodiments of step S302, the second counter unit 712 receives the local reference clock C2 and outputs the frequency of the local reference clock C2. It should be noted that step S302 may alternatively be performed prior to step S301. In step S303, the frequency comparison unit 713 compares the first counting value and the second counting value and outputs the frequency difference. In some embodiments of step S303, the frequency comparison unit 713 compares the frequency of the recovered clock C1 and the frequency of the local reference clock C2 and outputs the frequency difference.

As set forth, in embodiments where the communication speed signal S1 is also taken into consideration, the IPG adjustment mapping table 721 comprises the correspondence relationship between the IPG adjustment value, the frequency difference, and the communication speed signal S1, as the example shown in Table 1 above.

As above, one or some embodiments of the present disclosure provide a superior loopback configuration for communication devices with no packet drops and no compromise in clock quality. One or some embodiments of the present disclosure allow a communication device to loop back packets to the sender without dropping any packet. As a result, the loopback can perform optimally, and any packet drop in the system is not due to clock mismatch. In addition, one or some embodiments of the present disclosure allows the transmitted packets to be transmitted purely with the local reference when the loopback functionality is disabled. This allows the loopback configuration to be exactly electrically the same as the non-loopback configuration, and therefore any packet drop will not be due to clock mismatch or jitters.

What is claimed is:

1. A communication device comprising:
a CDR (clock data recover) circuitry configured to recover a clock of incoming packets and output a recovered clock;
a receiver circuitry coupled to the CDR circuitry and configured to operate based on the recovered clock and receive the incoming packets;
a transmitter circuitry configured to operate based on a local reference clock and transmit outgoing packets and IPGs (interpacket gaps) therebetween, wherein a length of each of the IPGs corresponds to an IPG adjustment signal; and
an IPG adjustment circuitry, coupled between the transmitter circuitry and the CDR circuitry, configured to output the IPG adjustment signal based on a comparison of a frequency of the recovered clock and a frequency of the local reference clock.

2. The communication device according to claim 1, wherein the IPG adjustment circuitry comprises:
a frequency difference determination circuitry configured to receive the recovered clock and the local reference clock and output a frequency difference based on the recovered clock and the local reference clock; and
an IPG determination circuitry configured to receive the frequency difference and output the IPG adjustment signal based on the frequency difference.

3. The communication device according to claim 2, wherein the frequency difference determination circuitry comprises:

a first counter circuitry configured to receive the recovered clock and output a first counting value;
a second counter circuitry configured to receive the local reference clock and output a second counting value; and
a frequency comparison circuitry configured to compare the first counting value and the second counting value and output the frequency difference.

4. The communication device according to claim 2, wherein the IPG determination circuitry is configured to output the IPG adjustment signal in accordance with an IPG adjustment mapping table, the IPG adjustment mapping table comprises a correspondence relationship between an IPG adjustment value and the frequency difference, and the IPG adjustment signal indicates an adjustment to the length of each of the IPGs in accordance with the IPG adjustment value.

5. The communication device according to claim 1, wherein in response to the frequency of the recovered clock being greater than the frequency of the local reference clock, the IPG adjustment signal indicates a negative IPG adjustment.

6. The communication device according to claim 1, wherein the IPG is negatively correlated with the frequency of the recovered clock.

7. The communication device according to claim 1, wherein the IPG adjustment circuitry is configured to output the IPG adjustment signal based on a communication speed signal and the comparison of the frequency of the recovered clock and the frequency of the local reference clock.

8. An IPG (interpacket gap) adjustment method applied to a communication device, the method comprising:
recovering a clock of incoming packets and outputting a recovered clock;
receiving the incoming packets in accordance with the recovered clock;
outputting an IPG adjustment signal based on a comparison of a frequency of the recovered clock and a frequency of a local reference clock;
temporarily storing the incoming packets; and
transmitting the incoming packets as the outgoing packets in accordance with the local reference clock, wherein an IPG exists between two consecutive ones of the outgoing packets, and a length of the IPG is adjusted in accordance with the IPG adjustment signal.

9. The IPG adjustment method according to claim 8, wherein the step of outputting the IPG adjustment signal comprises:
outputting a frequency difference based on the recovered clock and the local reference clock; and
outputting the IPG adjustment signal based on the frequency difference.

10. The IPG adjustment method according to claim 9, wherein the step of outputting the frequency difference comprises:
counting the recovered clock and outputting a first counting value;
counting the local reference clock and outputting a second counting value; and
comparing the first counting value and the second counting value and outputting the frequency difference.

11. The IPG adjustment method according to claim 9, wherein the IPG adjustment signal is generated in accordance with an IPG adjustment mapping table, the IPG adjustment mapping table comprises a correspondence relationship between an IPG adjustment value and the frequency difference, and the IPG adjustment signal indicates an adjustment to a length of each of the IPGs in accordance with the IPG adjustment value.

12. The IPG adjustment method according to claim 8, wherein in response to the frequency of the recovered clock being greater than the frequency of the local reference clock, the IPG adjustment signal indicates a negative IPG adjustment.

13. The IPG adjustment method according to claim 8, the IPG is negatively correlated with the frequency of the recovered clock.

14. The IPG adjustment method according to claim 8, wherein the IPG adjustment signal is outputted based on a communication speed signal and a comparison of the frequency of the recovered clock and the frequency of the local reference clock.

15. A communication device comprising:
   a CDR (clock data recover) circuitry configured to recover a clock of incoming packets and output a recovered clock;
   a receiver circuitry coupled to the CDR circuitry and configured to operate based on the recovered clock and receive the incoming packets;
   an IPG (interpacket gap) adjustment circuitry configured to output an IPG adjustment signal based on a comparison of a frequency of the recovered clock and a frequency of a local reference clock; and
   a transmitter circuitry configured to operate based on the local reference clock and transmit outgoing packets and IPGs therebetween in response to the communication device operating at a loopback mode, wherein a length of the IPG is adjusted in accordance with the IPG adjustment signal, and the IPG adjustment circuitry is coupled between the CDR circuitry and the transmitter circuitry.

16. The communication device according to claim 15, wherein the IPG is negatively correlated with the frequency of the recovered clock.

17. The communication device according to claim 15, wherein the IPG is adjusted in accordance with the IPG adjustment signal and a communication speed signal.

18. The communication device according to claim 15, wherein the IPG adjustment signal is generated in accordance with an IPG adjustment mapping table; and wherein the IPG adjustment mapping table comprises a correspondence relationship between an IPG adjustment value and the frequency difference, and the IPG adjustment signal indicates an adjustment to a length of each of the IPGs in accordance with the IPG adjustment value.

19. The communication device according to claim 15, wherein the IPG adjustment circuitry comprises:
   a frequency difference determination circuitry configured to receive the recovered clock and the local reference clock and output a frequency difference based on the recovered clock and the local reference clock; and
   an IPG determination circuitry configured to receive the frequency difference and output the IPG adjustment signal based on the frequency difference.

* * * * *